E. F. & T. D. Prentiss.
Rectifying App's.

Nº 87,792.  Patented Mar. 16, 1869.

United States Patent Office.

E. FREEMAN PRENTISS AND THOMAS D. PRENTISS, OF PHILADELPHIA, PENNSYLVANIA.

*Letters Patent No. 87,792, dated March 16, 1869.*

IMPROVED APPARATUS FOR RECTIFYING AND DISTILLING SPIRITS AND OTHER VOLATILE LIQUIDS.

*The Schedule referred to in these Letters Patent and making part of the same.*

*To all whom it may concern:*

Be it known that we, E. FREEMAN PRENTISS and THOMAS D. PRENTISS, both of Philadelphia, Pennsylvania, have invented a new and useful Apparatus for Rectifying Spirits and other Volatile Liquids; and we do hereby declare that the following is a full and exact description of the construction and operation of the same, reference being had to the annexed drawings, forming part hereof, and to the several letters marked thereon, in which drawings—

$a$ and $b$ represent the vapor-generators;
$c$, the primary condenser;
$d$, the secondary condenser; and
$e$, the final condenser.

$f$ is a pipe, which conveys the vapors generated in the vessel $a$, into the worm $g$, which returns toward and terminates at a short distance above the bottom of the vessel $b$, as shown.

$h$ is a pipe, which connects the top of the vessel $b$ with the primary condenser $c$, which is provided with a perforated false bottom, and a top of similar construction, the intermediate space being filled with small pebbles or broken pumice-stone.

Figure 1:
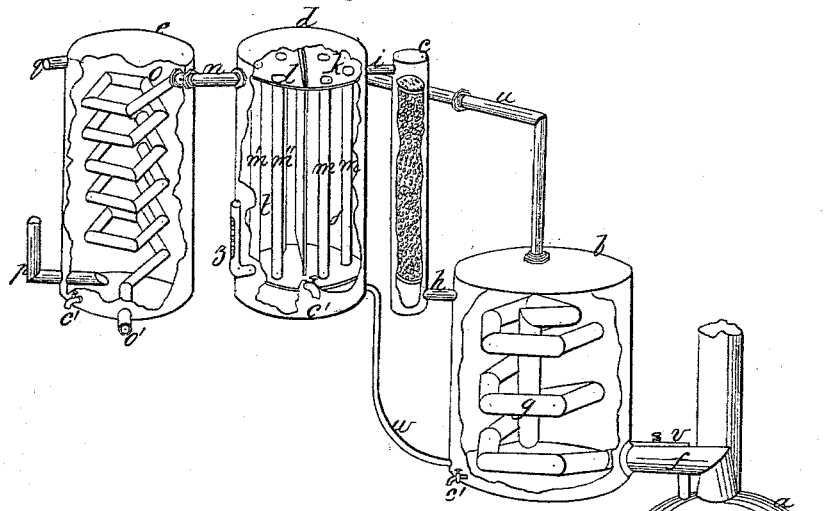
Figure 1 is a perspective view of the apparatus, a portion of the shell of each column, or vessel, being broken away, to show the enclosed parts.

$i$ is a pipe, for conveying the vapors, which rise to the chamber in vessel $c$, above its false top, into the chamber $k$, of vessel $d$, which also is provided with a false top and bottom, as shown in fig. 1.

The chamber in vessel $d$, above the false top thereof, is divided into two parts, $k$ and $l$, by a vertical partition, which extends down to within a short distance of the false bottom, dividing the space enclosed between said top and bottom into two compartments, $s$ and $t$, united at bottom, as shown.

$m\ m'$ are vertical pipes, connecting the top and bottom chambers of vessel $d$.

$n$ is a pipe connecting the chamber $l$, of vessel $d$, with the worm $o$, in vessel $e$.

$p$ is a pipe, by which cold water is let into vessel $e$, and $q$ is the exit-pipe for the same water.

Figure 2:
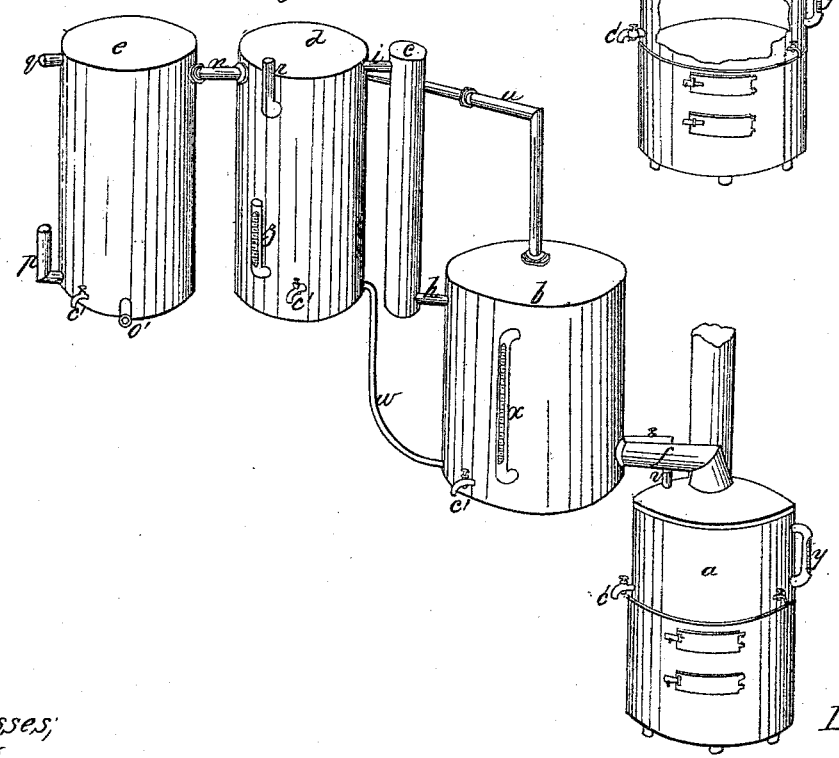
Figure 2 is also a perspective view of the apparatus, conveying a clear exterior view thereof.

$r$, fig. 2, is a pipe leading into chamber $t$, of vessel $d$. This pipe is provided with a stop-cock, not shown, for regulating the inward flow of the wash.

$u$ is a pipe, which conveys the wash from compartment $s$, of vessel $d$, into the vessel $b$.

$v$ is a pipe, leading from the bottom of vessel $b$ into the top of vessel $a$.

$w$ is a pipe, leading from the bottom chamber of vessel $d$ into the bottom of vessel $b$.

$x$ and $y$ are ordinary gauges for indicating the height of the liquids in vessels $a$ and $b$.

$z$ is an ordinary thermometer, connected with compartment $t$, of vessel $d$.

The several vessels are emptied through stop-cocks $C'$.

The wash is introduced, through pipe $r$, into the top of the compartment $t$, of vessel $d$, filling this compartment, and also compartment $s$; thence flowing, through pipe $u$, into vessel $b$, where it is partially vaporized, the residue being, from time to time, let down, through pipe $v$, into vessel $a$, where it is subjected to higher heat, and where what remains of spirit is vaporized, the vapors passing, through pipe $f$, into worm $g$, which conducts them to the bottom of vessel $b$, where they escape, and bubbling up through the wash contained in this vessel, to the top of the vessel, they pass thence out, through pipe $h$, into the primary condenser $c$, where a portion of the watery vapors is condensed, the resulting liquid flowing back, through pipe $h$, into vessel $b$.

The lighter portion of the vapors rising through the pebbles to the top of condenser $c$, passes off, through pipe $i$, into chamber $k$, of vessel $d$, thence down, through pipes $m$, to the bottom chamber of vessel $d$, where further condensation of the more watery portion of the vapors takes place, the resulting liquid flowing back, through pipe $w$, into vessel $b$.

The lighter portion of the vapors rises, through pipes $m'$, into chamber $l$, thence passing, through pipe $n$, into the angular worm $o$, where it is condensed into spirits, which runs off at $o'$.

From the arrangement of the several vessels employed, the wash, and the more watery portions of the vapors condensed in vessels $c$ and $d$, descend, by their own gravity, to the vaporizers $a$ and $b$.

We construct the vessels $b\ c\ d\ e$ in cylindrical form, of copper, tinned inside.

The generator $a$, as represented, is made of copper, but, when steam is employed as the heating-agent, said vessel may be made of wood, enclosing a coil of pipe for dry steam.

For an apparatus capable of producing ten (10) barrels of proof-spirits per diem, we prefer to make the generator, $a$, twenty-eight inches in diameter, and sixteen inches in height, but when made of wood, it may be three feet in height; pipe $f$, two and a half inches diameter; vessel $b$, fifteen inches diameter, and eighteen inches in height; worm $g$, two and a half inches diameter; pipe $h$, two and a half inches diameter; condenser $c$, five inches in diameter, and twenty-eight inches in height; pipe $i$, two and a half inches diameter; vessel $d$, twenty-eight inches in height, and twelve inches in diameter; pipes $m\ m'$, of one inch diameter, and twenty-four inches in length; pipe $n$, two inches in diameter; worm $o$, at top, two inches in diameter, gradually tapering to five-eighths of an inch at bottom;

vessel e, twenty-eight inches high, and twelve inches in diameter.

The described construction and arrangement of the several parts of the apparatus are such that the temperature of the vapors, as they approach final condensation, is gradually reduced, so that, in vessels c and d, all the fusel-oil is condensed, and, with the other condensed vapors, is led back, through pipes h and w, to the vessel b, while the essential oil, which is of lighter gravity, passes on, with the spirit-vapors, into the final-condensing worm o.

The supply of wash admitted into vessel d must be so regulated, by setting the stop-cock in pipe r, when the operation is started, as to keep the temperature of compartment t, of vessel d, at about 140° Fahrenheit.

The wash in vessel a is kept at boiling-point, and, if it contains twenty-five per cent. of spirits when admitted into vessel d, will contain only about eight per cent. when it reaches vessel a, and, if kept at boiling-point in this vessel, will be exhausted of spirits in about twenty minutes.

The residuum is then drawn off through cock c', and the vessel a is recharged, from vessel b, by opening stop-cock v, which is again closed as soon as the vessel a is charged.

The worms employed are angular, being composed of sections of cylindrical pipe, united by elbows. Those shown are pentagonal, but a different polygonal form might, of course, be employed.

We have found, from experiment, that the vapors passing through these angular worms give off their heat more rapidly than when traversing a continuously-winding worm.

This method of construction also enables us to employ much thinner copper than could otherwise be employed, and thus contribute to the same end, viz, the rapid giving off of the heat of the vapors.

From the same causes, we are enabled to reduce the size of the final condenser.

Having thus described our invention,

We claim, and desire to secure by Letters Patent—

1. The combination of vessels b, c, d, and e, constructed and arranged in the manner and for the purpose substantially as set forth.

2. The arrangement of worm g, in vessel b, for heating the liquids in said vessel, substantially as set forth.

3. In combination with one or more vapor-generators, the primary condenser c and the secondary condenser d, to effect the gradual reduction of temperature of the vapors, and the removal of the fusel-oil, substantially as set forth.

E. FREEMAN PRENTISS.
THOMAS D. PRENTISS.

Witnesses:
GEO. E. BUCKLEY,
W. A. A. McKINLEY.